United States Patent
Jones et al.

(10) Patent No.: US 9,695,696 B2
(45) Date of Patent: Jul. 4, 2017

(54) TURBINE BLADE WITH SECTIONED PINS

(71) Applicant: General Electric Company, Schenectady, NY (US)

(72) Inventors: Mark Andrew Jones, Greer, SC (US); Bradley Taylor Boyer, Greenville, SC (US); Robert Alan Brittingham, Greer, SC (US); Gregory Thomas Foster, Greer, SC (US); Christopher William Kester, Greenville, SC (US)

(73) Assignee: General Electric Company, Schenectady, NY (US)

( * ) Notice: Subject to any disclaimer, the term of this patent is extended or adjusted under 35 U.S.C. 154(b) by 947 days.

(21) Appl. No.: 13/955,679

(22) Filed: Jul. 31, 2013

(65) Prior Publication Data

US 2015/0037165 A1    Feb. 5, 2015

(51) Int. Cl.
| | |
|---|---|
| *F01D 5/16* | (2006.01) |
| *F01D 5/18* | (2006.01) |
| *B23P 15/04* | (2006.01) |
| *F01D 5/14* | (2006.01) |
| *B22C 9/10* | (2006.01) |
| *B22C 9/24* | (2006.01) |

(52) U.S. Cl.
CPC .............. *F01D 5/16* (2013.01); *B22C 9/10* (2013.01); *B22C 9/24* (2013.01); *B23P 15/04* (2013.01); *F01D 5/147* (2013.01); *F01D 5/18* (2013.01); *F01D 5/186* (2013.01); *F01D 5/187* (2013.01); *F05D 2240/304* (2013.01); *F05D 2240/305* (2013.01); *F05D 2240/306* (2013.01); *F05D 2260/2212* (2013.01); *F05D 2260/2214* (2013.01); *F05D 2260/22141* (2013.01); *F05D 2260/961* (2013.01); *Y10T 29/49337* (2015.01)

(58) Field of Classification Search
CPC . F01D 5/16; F01D 5/186; F01D 5/187; F01D 5/147; F05D 2240/304; F05D 2240/305; F05D 2240/306; F05D 2260/961; F05D 2260/22141
See application file for complete search history.

(56) References Cited

U.S. PATENT DOCUMENTS

| | | | |
|---|---|---|---|
| 4,514,144 A | * | 4/1985 | Lee .................... B22C 9/04 416/96 R |
| 4,515,523 A | | 5/1985 | North et al. |
| 4,786,233 A | * | 11/1988 | Shizuya ............... F01D 5/187 416/90 R |
| 5,356,265 A | * | 10/1994 | Kercher ............... F01D 5/186 416/97 R |
| 5,403,156 A | | 4/1995 | Arness et al. |
| 5,695,322 A | | 12/1997 | Jacobson et al. |
| 6,290,462 B1 | | 9/2001 | Ishiguro et al. |

(Continued)

*Primary Examiner* — Ninh H Nguyen
(74) *Attorney, Agent, or Firm* — James W. Pemrick; Ernest G. Cusick; Frank A. Landgraff

(57) ABSTRACT

A turbine blade is provided and includes pressure and suction surfaces connected to define an interior through which coolant is passable and first and second pedestal arrays, each of the first and second pedestal arrays including pedestals respectively coupled to radially outboard portions of respective interior faces of one of the pressure and suction surfaces. The pedestals of the first pedestal array are separated from pedestals of the second pedestal array by gaps respectively defined therebetween.

15 Claims, 6 Drawing Sheets

(56) References Cited

U.S. PATENT DOCUMENTS

| | | | |
|---|---|---|---|
| 6,607,356 B2 * | 8/2003 | Manning | F01D 5/187 416/97 R |
| 6,902,372 B2 | 6/2005 | Liang | |
| 6,974,308 B2 | 12/2005 | Halfmann et al. | |
| 6,984,102 B2 | 1/2006 | Bunker et al. | |
| 7,008,179 B2 | 3/2006 | Rinck et al. | |
| 7,175,386 B2 | 2/2007 | Cherolis et al. | |
| 7,186,084 B2 | 3/2007 | Bunker et al. | |
| 7,438,527 B2 | 10/2008 | Albert et al. | |
| 7,465,154 B2 | 12/2008 | Devore et al. | |
| 7,513,745 B2 | 4/2009 | Abdel-Messeh et al. | |
| 7,520,312 B2 | 4/2009 | Memmen | |
| 7,544,044 B1 | 6/2009 | Liang | |
| 7,686,580 B2 | 3/2010 | Cunha et al. | |
| 7,713,027 B2 | 5/2010 | Cherolis et al. | |
| 7,857,589 B1 | 12/2010 | Liang | |
| 7,938,624 B2 | 5/2011 | Tibbott | |
| 8,066,483 B1 | 11/2011 | Liang | |
| 8,137,068 B2 | 3/2012 | Surace et al. | |
| 8,147,205 B2 | 4/2012 | Digard Brou De Cuissart et al. | |
| 8,206,108 B2 | 6/2012 | Riahi et al. | |
| 8,231,349 B2 | 7/2012 | Naik et al. | |
| 8,292,581 B2 | 10/2012 | Poon et al. | |
| 8,366,399 B2 | 2/2013 | Allen-Bradley et al. | |
| 8,403,626 B2 | 3/2013 | Hasselqvist et al. | |
| 8,419,365 B2 | 4/2013 | Kizuka et al. | |
| 2006/0210546 A1 | 9/2006 | Sokol et al. | |
| 2006/0269408 A1 | 11/2006 | Liang | |
| 2008/0286104 A1 * | 11/2008 | Liang | F01D 5/187 416/95 |
| 2012/0076660 A1 | 3/2012 | Spangler et al. | |
| 2012/0269648 A1 | 10/2012 | Lee | |
| 2012/0328450 A1 | 12/2012 | Spangler et al. | |

\* cited by examiner

TURBINE BLADE WITH SECTIONED PINS

BACKGROUND OF THE INVENTION

The subject matter disclosed herein relates to turbine blades and, more particularly, to turbine blades with sectioned pins.

A turbine blade may be disposed in a turbine section of a gas turbine engine. The turbine blade may be installed as part of an array of turbine blades in one of multiple axially arranged stages of the turbine section. As each array aerodynamically interacts with combustion gases, the array rotates about a rotor extending through the turbine section and causes corresponding rotation of the rotor that can be used to drive a compressor and a load.

When tuning natural frequencies of a turbine blade, one can increase the frequency by increasing the stiffness of the blade and/or reducing the mass of the blade (vice versa for reducing the frequency). However, since increasing stiffness usually involves adding mass, tuning can become challenging due to the competing nature of these tuning knobs.

BRIEF DESCRIPTION OF THE INVENTION

According to one aspect of the invention, turbine blade is provided and includes pressure and suction surfaces connected to define an interior through which coolant is passable and first and second pedestal arrays, each of the first and second pedestal arrays including pedestals respectively coupled to radially outboard portions of respective interior faces of one of the pressure and suction surfaces. The pedestals of the first pedestal array are separated from pedestals of the second pedestal array by gaps respectively defined therebetween.

According to another aspect of the invention, a turbine blade is provided and includes pressure and suction surfaces connected to define an interior through which a coolant is passable and first and second pedestal arrays, each of the first and second pedestal arrays including extended pedestals respectively coupled to respective interior faces of one of the pressure and suction surfaces and pedestals respectively coupled to radially outboard portions of respective interior faces of one of the pressure and suction surfaces. The pedestals of the first pedestal array are separated from pedestals of the second pedestal array by gaps respectively defined therebetween.

According to yet another aspect of the invention, a method of forming a turbine blade is provided and includes creating a cavity forming ceramic core including an elongate element having pedestal forming recesses separated from pedestal forming recesses by gap forming core portions, forming pressure and suction sides of the turbine blade on either side of the elongate element such that the pressure and suction sides include pedestals formed in the pedestal forming recesses and assembling the pressure and suction sides of the turbine blade together such that the pressure side pedestals are separated from the suction side pedestals by gaps having dimensions similar to the gap forming core portions.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
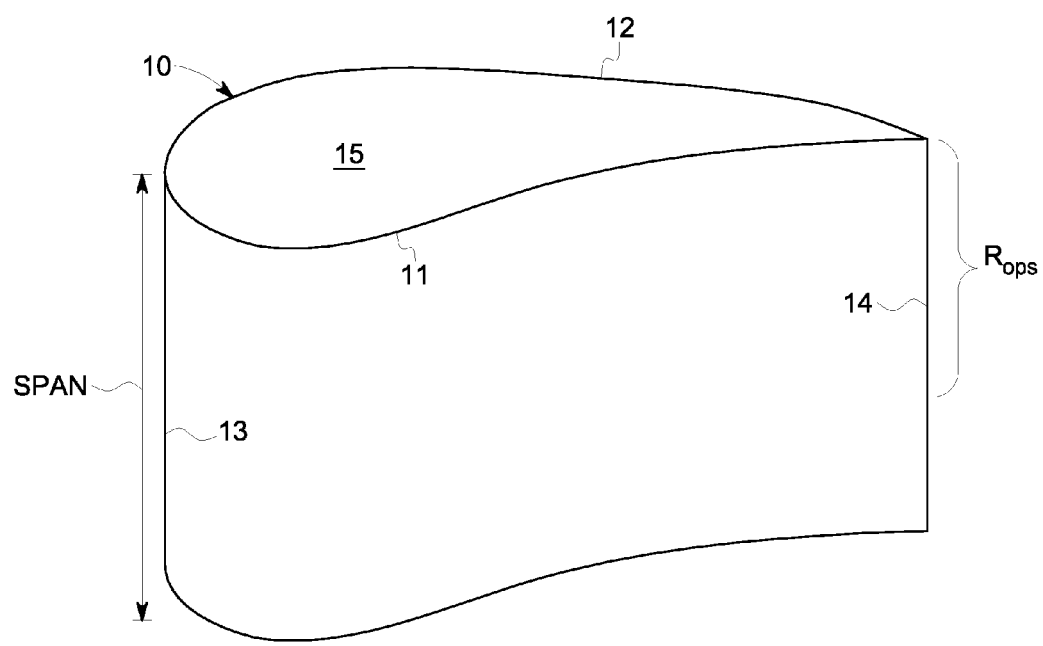
FIG. 1 is a schematic perspective view of a turbine blade.
Figure 2:
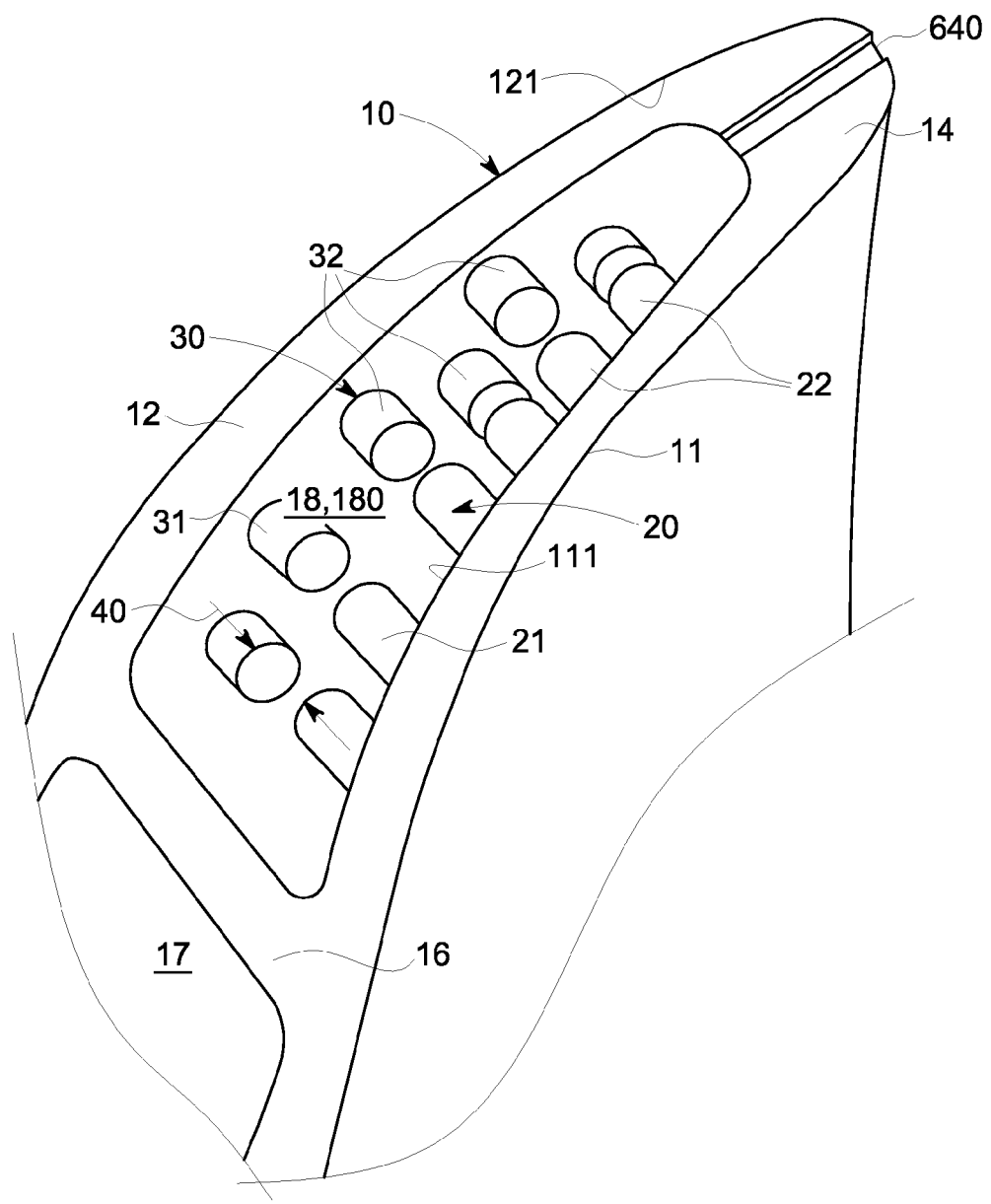
FIG. 2 is an enlarged perspective view of a trailing edge cavity of a turbine blade including sectioned pin banks in accordance with embodiments.

With reference to FIGS. 1 and 2, a turbine blade 10 is provided for use in, e.g., a gas turbine engine in which the turbine blade 10 is installed in a turbine section where combustion gases are expanded to produce work. The turbine blade 10 may be installed as part of an array of turbine blades in one of multiple axially arranged stages of the turbine section. As each array aerodynamically interacts with the combustion gases, the array rotates about a rotor extending through the turbine section. The rotation of the array causes corresponding rotation of the rotor that can be used to drive rotation of a compressor and a load.

The turbine blade 10 includes a pressure surface 11 and a suction surface 12 that are arranged oppositely with respect to one another. Both the pressure surface 11 and the suction surface 12 have a similar span that extends along a radial dimension of the rotor. The pressure surface 11 and the suction surface 12 may be connected to one another at a leading edge 13 and a trailing edge 14 such that they define an interior 15. The turbine blade 10 may further include baffles 16 (see FIG. 2) extending through the interior 15 along portions of the spans of the pressure surface 11 and the suction surface 12. The baffles 16 define pathways 17 or cavities 18 by which coolant can be directed and passed through the interior 15. The cavity 18 proximate to the trailing edge 14 will be referred to herein as a "trailing edge cavity" 180.

The turbine blade 10 further includes a first pedestal array 20 and a second pedestal array 30. The first pedestal array 20 includes a pedestal 21 coupled to at least a radially outboard portion of an interior face 111 of the pressure surface 11 in the trailing edge cavity 180. The second pedestal array 30 includes a pedestal 31 coupled to at least a radially outboard portion of an interior face 121 of the suction surface 12 in the trailing edge cavity 180. As shown in FIG. 2, it is to be understood the pedestals 21 and 31 may be provided as a first plurality of pedestals 21 and as a second plurality of pedestals 31. For purposes of clarity and brevity, the case in which the pedestals 21 and 31 are provided as the first plurality of pedestals 21 and as the second plurality of pedestals 31 will be described below. It is also to be understood that the pedestals 21 and 31 need not be located only in the trailing edge cavity 180.

The radially outboard portion of the interior face 111 and the radially outboard portion of the interior face 121 are defined at a radially outboard portion $R_{OPS}$ of the span. Thus, in accordance with embodiments, the first plurality of pedestals 21 and the second plurality of pedestals 31 are provided at least at the radially outboard portion $R_{OPS}$ of the span (see FIG. 6). In accordance with further embodiments, however, the first plurality of pedestals 21 and the second plurality of pedestals 31 may be provided along the entirety of the span.

Each individual pedestal 22 of the first plurality of pedestals 21 of the first pedestal array 20 may, but is not required to, correspond in location to a corresponding individual pedestal 32 of the second plurality of pedestals 31 of the second pedestal array 30. That is, in accordance with alternative embodiments, the individual pedestals 22 may be misaligned with respect to the individual pedestals 32. In addition, each individual pedestal 22 is separated by a gap 40 from one or more of the individual pedestals 32. As shown in FIG. 2, since a gap 40 is provided for at least pairs of individual pedestals 22 and 32, the turbine blade 10 is provided with multiple gaps 40.

In accordance with embodiments, the gap 40 may be about 0.03 inches wide although this is not required and embodiments exist in which the gap 40 is wider or narrower and where the size of the gap 40 varies. More generally, the gap 40 is larger than any gap that would normally be found in a conventional turbine blade as a result of manufacturing tolerances resulting from the shape and size of the conventional ceramic core and the injection molding or casting of the conventional pressure and suction sides.

In accordance with further embodiments, the interior 15 of the turbine blade 10 may be but is not required to be devoid of a pin that extends along an entirety of the distance between the interior face 111 of the pressure surface 11 and the interior face 121 of the suction surfaces 12 (i.e., the turbine blade 10 may be configured such that it does not include "fully elongated" pins). However, where the turbine blade 10 does include fully elongated pins, the baffles 16 may be distinguished from such fully elongate pins in that the baffles 16 extend along a substantial length of the spans of the pressure and suction surfaces 11 and 12 and thereby define the overall shapes and sizes of the pathways 17, the cavities 18 generally and the trailing edge cavity 180 particularly.

Figure 3:
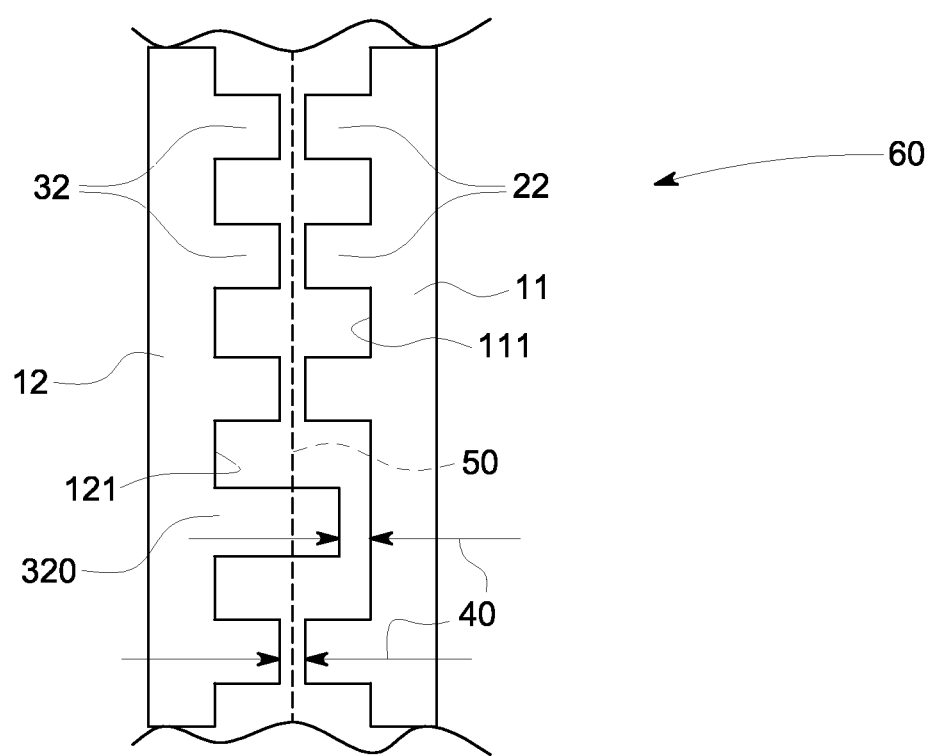
FIG. 3 is a schematic view of gaps formed between pedestals of sectional pin banks in accordance with embodiments.
Figure 4:
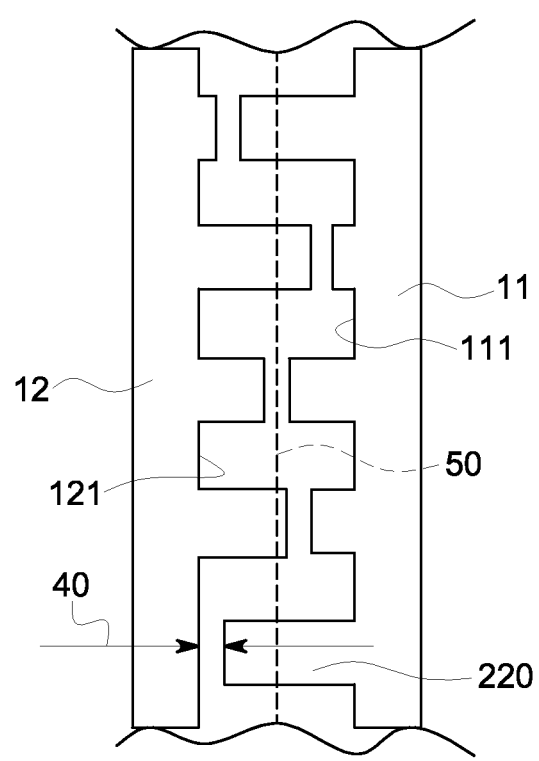
FIG. 4 is a schematic view of staggered gaps formed between pedestals of sectional pin banks in accordance with embodiments.
Figure 5:
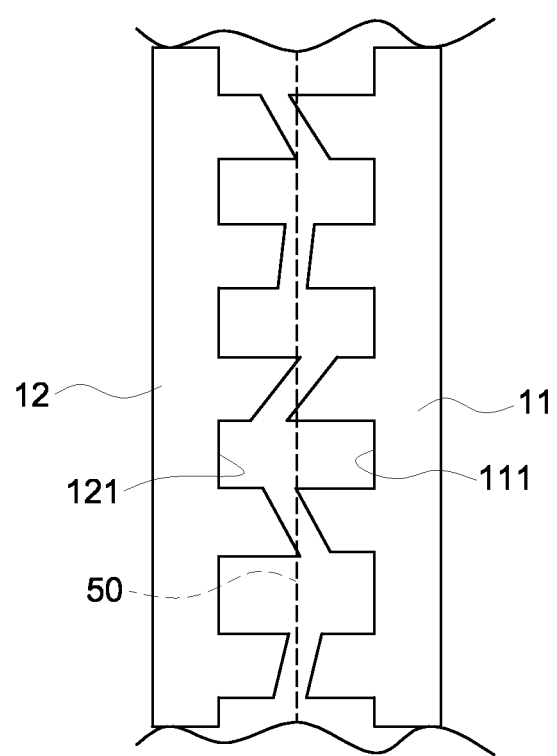
FIG. 5 is a schematic view of non-parallel gaps formed between pedestals of sectional pin banks in accordance with embodiments.

With reference to FIGS. 3-5, various embodiments will now be described. As shown in FIG. 3, all or a portion of the gaps 40 may be defined along a mean camber line 50 of the turbine blade 10 where the mean camber line 50 is cooperatively defined by the respective shapes of the pressure and suction surfaces 11 and 12. Alternatively, although not shown in FIG. 3, it is to be understood that all or a portion of the gaps 40 may be defined on one side of the mean camber line 50. As shown in FIG. 4, all or a portion of the gaps 40 may be defined on both sides of or along the mean camber line 50. In these embodiments, all or a portion of adjacent gaps 40 may be defined on opposite sides of the mean camber line 50. Alternatively, a distribution of all or a portion of the gaps 40 may be defined on each side of the mean camber line 50 at random. As shown in FIGS. 3 and 4, all or a portion of the gaps 40 may be defined in parallel with the mean camber line 50. Alternatively, as shown in FIG. 5, all or a portion of the gaps 40 may be oriented transversely or non-parallel with respect to the mean camber line 50.

In addition, as shown in FIGS. 3 and 4, individual extended pedestals 220, 320 may be respectively coupled to the respective interior faces 111, 121 of the pressure and suction surfaces 11 and 12. The individual extended pedestals 220, 320 are distinguished from the individual pedestals 22 and 32 in that the individual extended pedestals 220 extend from the interior face 111 and are separated from the interior face 121 by corresponding gaps 40 while the individual extended pedestals 320 extend from the interior face 121 and are separated from the interior face 111 by corresponding gaps 40.

In each case, the embodiments of FIGS. 3-5 may be provided alone or in various combinations with one another. Generally, the size, shape and orientation of the individual pedestals 22 and 32 and the gaps 40 may be provided in accordance with various design considerations of the turbine blade 10. For example, when tuning natural frequencies of a turbine blade, one can increase the frequency by increasing the stiffness of the blade and/or reducing the mass of the blade (vice versa for reducing the frequency). However, since increased stiffness may involve adding mass, tuning can become challenging due to the competing nature of these tuning effects. That is, the frequency of a blade with trailing edge motion can be altered if the stiffness could be affected without appreciably impacting the mass. This can be accomplished in accordance with the embodiments described herein. By providing the gaps 40 between the individual pedestals 22 and 32 (i.e., by separating the individual pedestals 22 and 32), the pressure side of the turbine blade 10 can be decoupled from the suction side and stiffness can be reduced. However, by maintaining the individual pedestals 22 and 32 and making the gaps 40 relatively small, the mass of the turbine blade 10 is negligibly affected.

In accordance with further aspects of the invention, the size, shape and orientation of the individual pedestals 22 and 32 and the gaps 40 may be provided in accordance with various particular design considerations of the turbine blade 10. For example, more effectively cooling relatively hotter regions on the pressure surface 11 or the suction surface 12 may be accomplished by the provision of longer individual pedestals 22 proximate to the hotter region, thus enhancing the fin effectiveness in that region.

Figure 6:
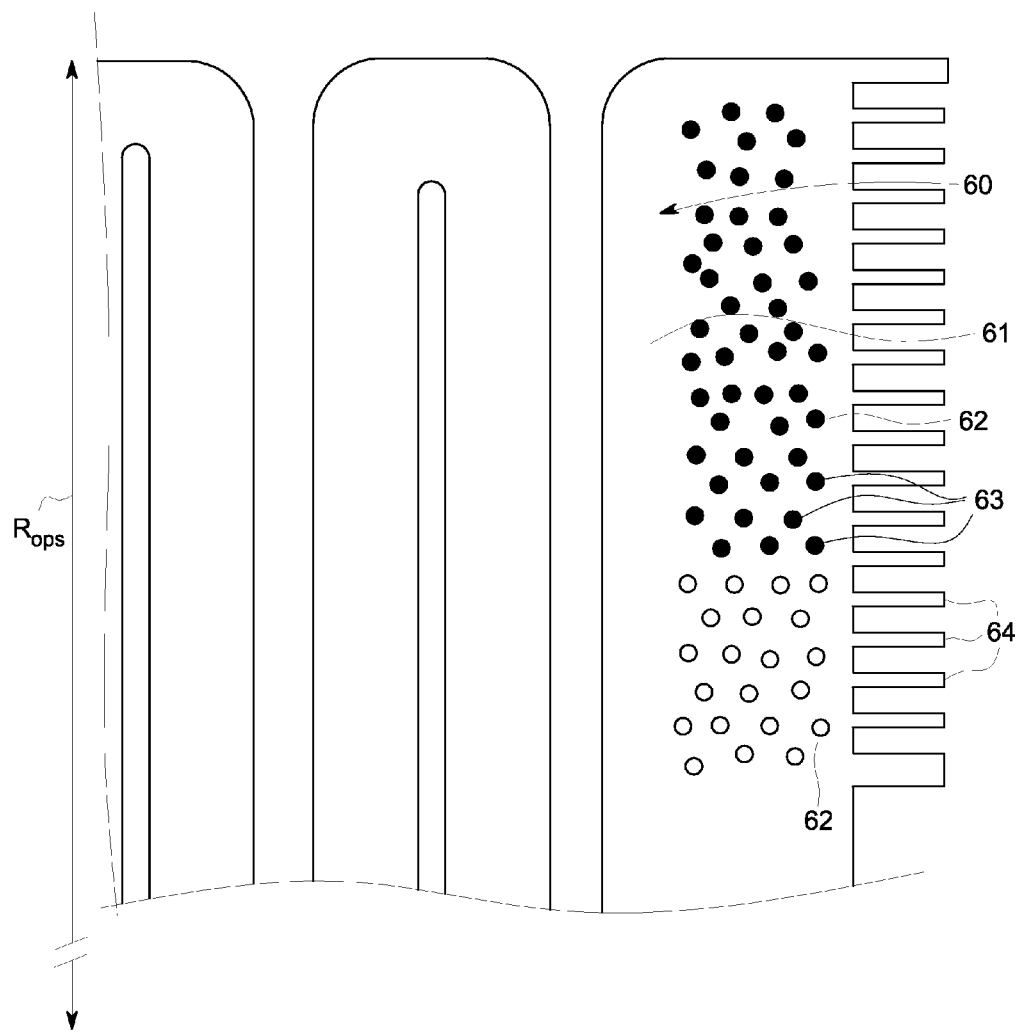
FIG. 6 is a perspective view of a ceramic core in accordance with embodiments.

With reference to FIG. 6, a method of forming the turbine blade 10 will now be described. The method includes creating a ceramic core 60 that can be used to form the trailing edge cavity 180. As shown in FIG. 6, the ceramic core 60 includes an elongate element 61 having pin forming recesses 62 and gap forming core portions 63 at least at the radially outboard portion $R_{OPS}$ of the span. The gap forming core portions 63 are disposed between the pedestal forming recesses 62 such that the individual pedestals 21 and 31 will be separate from one another. The elongate element 61 further includes trailing edge hole forming portions 64, which are arrayed along a side of the elongate element 61 to be used to form trailing edge holes 640 in the turbine blade (see FIG. 2).

Once the ceramic core 60 is created, the method further includes casting (or another similar manufacturing method or process) of pressure and suction sides of the turbine blade 10 on either side of the elongate element 61 such that the pressure and suction sides include the above-described individual pedestals 22 and 32 formed in the pedestal forming recesses 62 and assembling the pressure and suction sides of the turbine blade 10 together such that the pressure side individual pedestals 22 are separated from the suction side individual pedestals 32 by the gaps 40 having dimensions similar to the gap forming core portions 63.

Although the method as described above relates to cast components, it is to be understood that this is not required and that other manufacturing methods and processes may be employed for other types of components. For example, the individual pedestals 22 and 32 may be formed in part that is assembled or fabricated. Such a part may be provided as buckets, blades, nozzles or any other gas turbine components.

As described herein, a manufacturing process of the ceramic core 60 may be simplified as compared to conventional processes. In accordance with the embodiments described herein, the ceramic core 60 is created such that the gaps 40 are formed directly and preserved. Core yield may be thereby improved.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A turbine blade, comprising:
    pressure and suction surfaces connected to define an interior through which coolant is passable; and
    first and second pedestal arrays, each of the first and second pedestal arrays including pedestals respectively coupled to radially outboard portions of respective interior faces of one of the pressure and suction surfaces,
    the pedestals of the first pedestal array being separated from pedestals of the second pedestal array by gaps respectively defined therebetween,
    wherein the gaps are respectively defined on both sides of or along a camber line of the turbine blade, and
    wherein adjacent gaps are respectively defined on opposite sides of the camber line; and further wherein a distribution of gaps respectively defined on each side of the camber line is random.

2. The turbine blade according to claim 1, wherein the pedestals of the first pedestal array are respectively coupled to portions of the interior face of the pressure surface along an entire span of the turbine blade and the pedestals of the second pedestal array are respectively coupled to portions of the interior face of the suction surface along the entire span of the turbine blade.

3. The turbine blade according to claim 1, wherein the gaps are about 0.03 inches wide.

4. The turbine blade according to claim 1, wherein the gaps are respectively defined along a camber line of the turbine blade.

5. The turbine blade according to claim 1, wherein the gaps are respectively defined on one side of a camber line of the turbine blade.

6. The turbine blade according to claim 1, wherein the gaps are respectively defined in parallel with a camber line of the turbine blade.

7. The turbine blade according to claim 1, wherein the gaps are respectively oriented transversely or non-parallel with respect to a camber line of the turbine blade.

8. A turbine blade, comprising:
    pressure and suction surfaces connected to define an interior through which a coolant is passable; and
    first and second pedestal arrays, each of the first and second pedestal arrays including:
        extended pedestals respectively coupled to respective interior faces of one of the pressure and suction surfaces; and
        pedestals respectively coupled to radially outboard portions of respective interior faces of one of the pressure and suction surfaces,
        the pedestals of the first pedestal array being separated from pedestals of the second pedestal array by gaps respectively defined therebetween,
    wherein the gaps are respectively defined on one side of a camber line of the turbine blade,
    wherein a distribution of gaps respectively defined on each side of the camber line is random.

9. The turbine blade according to claim 8, wherein the pedestals of the first pedestal array are respectively coupled to portions of the interior face of the pressure surface along an entire span of the turbine blade and the pedestals of the second pedestal array are respectively coupled to portions of the interior face of the suction surface along the entire span of the turbine blade.

10. The turbine blade according to claim 8, wherein the gaps are respectively defined along a camber line of the turbine blade.

11. The turbine blade according to claim 8, wherein the gaps are respectively defined on both sides of or along a camber line of the turbine blade.

12. The turbine blade according to claim 8, wherein adjacent gaps are respectively defined on opposite sides of the camber line.

13. The turbine blade according to claim 8, wherein the gaps are respectively defined in parallel with a camber line of the turbine blade.

14. The turbine blade according to claim 8, wherein the gaps are respectively oriented transversely or non-parallel with respect to a camber line of the turbine blade.

15. A method of forming a turbine blade, comprising:
    creating a cavity forming ceramic core including an elongate element having pedestal forming recesses separated from pedestal forming recesses by gap forming core portions;
    forming pressure and suction sides of the turbine blade on either side of the elongate element such that the pressure and suction sides include pedestals formed in the pedestal forming recesses; and
    assembling the pressure and suction sides of the turbine blade together such that the pressure side pedestals are separated from the suction side pedestals by gaps having dimensions similar to the gap forming core portions, wherein the gaps are respectively defined on both sides of or along a camber line of the turbine blade, and wherein adjacent gaps are respectively defined on opposite sides of the camber line; and further wherein a distribution of gaps respectively defined on each side of the camber line is random.

* * * * *